United States Patent
Hartramph et al.

(10) Patent No.: US 11,035,697 B2
(45) Date of Patent: Jun. 15, 2021

(54) SENSOR SYSTEM AND METHOD FOR DETERMINING A POSITION OF A MEASURING ELEMENT ALONG A MOTION PATH

(71) Applicant: FESTO AG & Co. KG, Esslingen (DE)

(72) Inventors: Ralf Hartramph, Albershausen (DE); Fabian Albert, Kernen (DE); Andreas Veit, Filderstadt (DE)

(73) Assignee: FESTO SE & CO. KG, Esslingen (DE)

( * ) Notice: Subject to any disclaimer, the term of this patent is extended or adjusted under 35 U.S.C. 154(b) by 0 days.

(21) Appl. No.: 16/597,424

(22) Filed: Oct. 9, 2019

(65) Prior Publication Data

US 2020/0041309 A1   Feb. 6, 2020

Related U.S. Application Data

(63) Continuation of application No. 15/493,645, filed on Apr. 21, 2017, now abandoned.

(30) Foreign Application Priority Data

Apr. 22, 2016   (DE) .......................... 102016206905.5

(51) Int. Cl.
*G01D 5/14*   (2006.01)
(52) U.S. Cl.
CPC ................... *G01D 5/145* (2013.01)
(58) Field of Classification Search
CPC ........ G01D 5/145; G01D 5/142; G01R 15/20; G01R 15/202; G01R 21/08; G01R 33/06; G01R 33/07; G01R 33/077

USPC ...................................................... 324/207.2
See application file for complete search history.

(56) References Cited

U.S. PATENT DOCUMENTS

| | | | |
|---|---|---|---|
| 5,530,345 A | 6/1996 | Murari et al. | |
| 5,994,798 A | 11/1999 | Chitayat | |
| 9,746,344 B2 * | 8/2017 | Heineck | G01D 18/004 |
| 10,222,237 B2 * | 3/2019 | Lu | H01L 21/67259 |
| 2002/0008513 A1 | 1/2002 | Hiligsmann et al. | |
| 2004/0085065 A1 * | 5/2004 | Johnson | G01R 33/07 324/251 |
| 2006/0244464 A1 | 11/2006 | Kreit | |
| 2009/0102461 A1 * | 4/2009 | Santos | G01D 5/145 324/207.2 |

(Continued)

FOREIGN PATENT DOCUMENTS

| | | |
|---|---|---|
| DE | 10124761 | 2/2003 |
| DE | 102004018630 | 11/2005 |

(Continued)

*Primary Examiner* — Tung X Nguyen
*Assistant Examiner* — Robert P Alejnikov, Jr.
(74) *Attorney, Agent, or Firm* — Hoffmann & Baron, LLP

(57) ABSTRACT

A sensor system that simultaneously detects the positions of multiple movable carriages along a motion path. The sensor system includes a plurality of sensors arranged at least along a subsection of the motion path, wherein each sensor is designed for a contactless detection of a measuring element provided on each movable carriage. The sensor system also includes a processing device, which is connected electrically with the sensors and which is designed for a synchronous detection of sensor signals of the sensors.

15 Claims, 2 Drawing Sheets

(56) References Cited

U.S. PATENT DOCUMENTS

| | | | | |
|---|---|---|---|---|
| 2010/0039103 A1* | 2/2010 | Lenz | ................ | G01D 5/145 |
| | | | | 324/207.24 |
| 2011/0133723 A1 | 6/2011 | Forsyth et al. | | |
| 2011/0172938 A1 | 7/2011 | Gu et al. | | |
| 2015/0077092 A1* | 3/2015 | Kogej | ................ | G01D 5/24409 |
| | | | | 324/207.2 |
| 2015/0084619 A1* | 3/2015 | Stark | ................ | G01B 7/004 |
| | | | | 324/207.2 |
| 2015/0253162 A1* | 9/2015 | Kusumi | ................ | G01D 5/244 |
| | | | | 324/207.12 |
| 2017/0310262 A1* | 10/2017 | Albert | ................ | H04L 12/407 |

FOREIGN PATENT DOCUMENTS

| | | |
|---|---|---|
| DE | 202005016333 | 1/2006 |
| DE | 602004005672 | 12/2007 |
| DE | 102010055736 | 6/2012 |
| DE | 102013009862 | 12/2014 |
| EP | 2166313 | 3/2010 |
| EP | 2466269 | 11/2015 |

\* cited by examiner

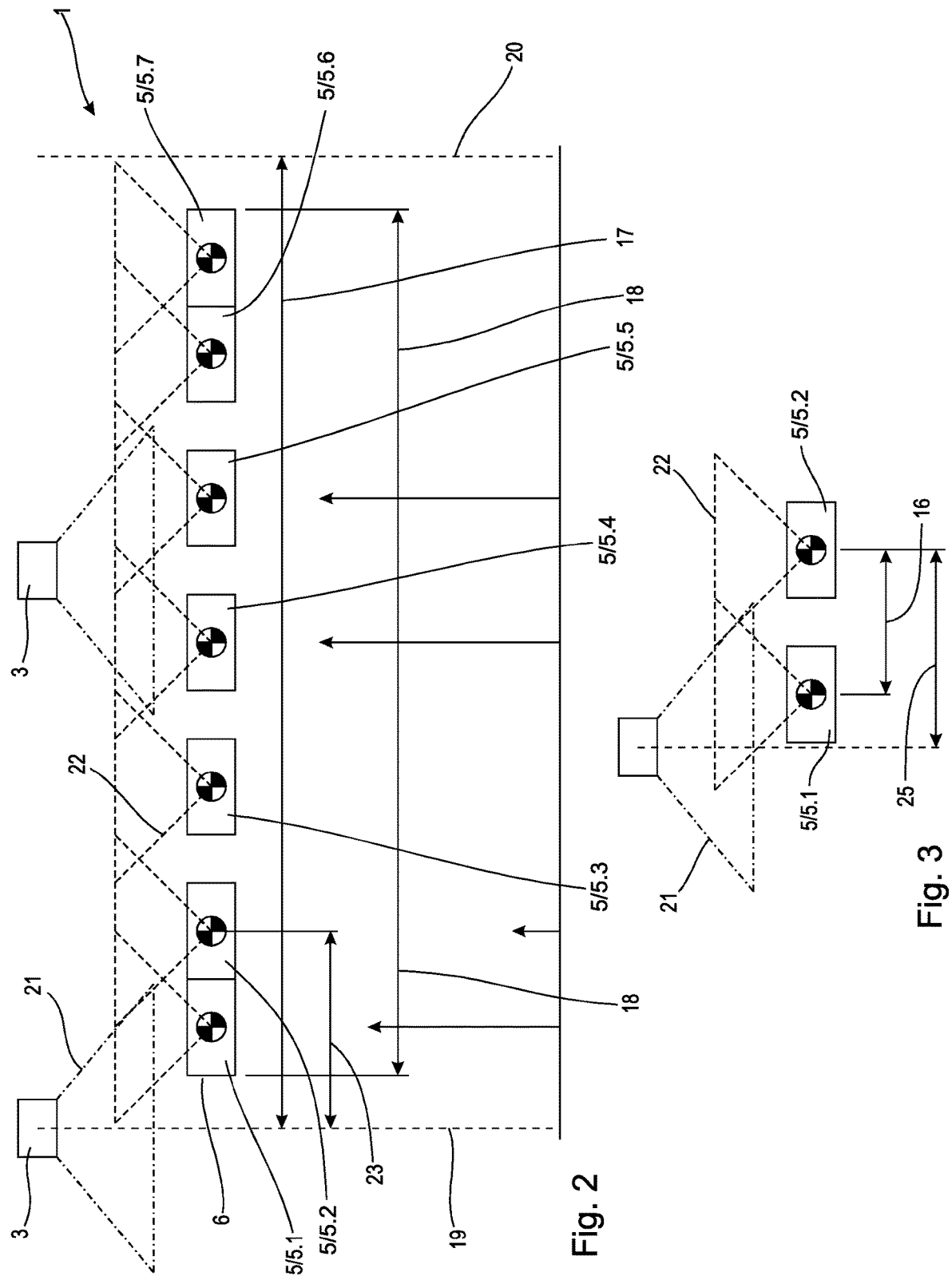

SENSOR SYSTEM AND METHOD FOR DETERMINING A POSITION OF A MEASURING ELEMENT ALONG A MOTION PATH

CROSS-REFERENCE TO RELATED APPLICATIONS

This application is a continuation application of U.S. application Ser. No. 15/493,645, filed Apr. 21, 2017, which claims priority to German Application No. DE 102016206905.5, filed on Apr. 22, 2016.

BACKGROUND OF THE INVENTION

The invention relates to a sensor system for detecting a position of a measuring element movable along a motion path, having a sensor arrangement, which comprises a plurality of sensors arranged at least along a subsection of the motion path, which in each case are designed for a contactless detection at least of one physical dimension dependent on a position of a measuring element along the motion path as well as for a provision at least of one sensor signal dependent on the at least one determined physical dimension, as well as having a processing device, which is connected electrically with the sensors and which is designed for a processing of the sensor signals to form at least one position signal, which represents the position at least of one measuring element along the motion path. Furthermore, the invention relates to a method for determining a position of a measuring element along a motion path.

A position sensor device with a plurality of sensor units is known from EP 2 466 269 B 1, wherein the sensor units in each case contain at least one detection unit suitable for the detection of a motion component located in its vicinity and are connected with a communication interface, which is designed for the output of a uniform position signal based on individual measuring signals of a plurality of sensor units, wherein the sensor units are designed as individual sensor modules equipped with electrical interface means, which can be lined up next to one another in variable number under mutual electrical linkage and forming a module strand.

SUMMARY OF THE INVENTION

The object of the invention is to provide a sensor system and a method for determining a position of a measuring element along a motion path with improved accuracy.

This object is achieved for a sensor system for detecting a position of a measuring element movable along a motion path, having a sensor arrangement, which comprises a plurality of sensors arranged at least along a subsection of the motion path, which in each case are designed for a contactless detection at least of one physical dimension dependent on a position of a measuring element along the motion path as well as for a provision at least of one sensor signal dependent on the at least one determined physical dimension, as well as having a processing device, which is connected electrically with the sensors and which is designed for a processing of the sensor signals to form at least one position signal, which represents the position at least of one measuring element along the motion path, wherein the processing device is designed for a synchronous detection of sensor signals of the sensors.

In this way a creation of a precise position image is made possible for at least one measuring element, preferably for several, in particular, for all of the measuring elements arranged along the motion path. Due to the synchronous detection of the sensor signals measurement errors can be eliminated, which can be attributed to a temporally successive and thus sequential detection of sensor signals of the sensor elements, as is provided in the prior art. Such a precise position image is of great importance, particularly when one or several measuring elements are moved with the same or different speed along the motion path and either an exertion of influence on the motions of the measuring element or the measuring elements is provided by means of at least one determined position signal or an exertion of influence on processing devices, which are provided for the processing of the measuring elements or of workpieces assigned to the measuring elements, is to take place. By way of example, it is possible to use the at least one determined position signal to exert influence on a motion device, which is used for a motion of the measuring element or of the measuring elements, in order to provide the measuring element/the measuring elements with a presettable speed profile. Additionally or alternatively provision can be made to control one or several processing devices by means of at least one determined position signal, in order to make possible an adjusted processing of at least one of the measuring elements or of one workpiece assigned to the respective measuring element. Purely as an example, for clarification of the influence possibilities, a laser marking of a workpiece must be mentioned, which is assigned to a measuring element and which is advanced at a preset or variable speed on a processing device designed as a laser marking system, wherein the marking process is adjusted depending on the speed of the workpiece, in order always to be able to apply the same marking independently of the speed of the workpiece. Even if only a single measuring element is positioned or is moved along the motion path, the processing device according to the present invention makes possible a highly precise determination of the position and/or of the motion speed of the measuring element, since through the synchronous detection of the sensor signals of the sensor elements in the processing device the influences of different signal propagation times, as they occur in a serial readout process for several sensors, can be minimised or completely eliminated.

Preferably, in the case of the processing device according to the present invention a parallel detection is provided of sensor signals, in particular of all sensor signals of sensors arranged along the subsection of the motion path. In order to ensure the synchronicity during the detection of the sensor signals of the sensors, the processing device can be designed to respond at the same time to all sensors to be detected synchronously at the same time and also at the same time to temporarily store the sensor signals provided by the sensors responded to for a further processing. By way of example, it is provided to respond to all sensors to be detected by a single trigger signal, wherein said trigger signal is outputted on the basis of a clock generator via parallel-branched lines to all sensors to be detected. When the trigger signal arrives at the individual sensors the latter immediately provide their sensor signal to the processing device, so that the synchronicity is ensured. This is the case in particular in light of the fact that delays between the sensor signals arriving at the processing device can occur at most as a result of different electrical line lengths and/or circuit-related tolerances of the individual sensors, which, however, are completely negligible in light of the running times for the electrical signals and in light of the speeds to be detected, which, for example, in the case of transport systems can be assumed to be in the range of a few mm/s to 10 m/s.

In principle, it can be provided that the sensors are arranged along the entire motion path. For practical reasons it can be advantageous if the sensors are arranged only along the subsection of the motion path, wherein it can be achieved by suitable measures that a detection of measuring elements is also possible within a presettable area away from the subsection of the motion path.

Advantageous further embodiments of the invention are the subject matter of the dependent claims.

It is expedient if the sensors are designed in particular as multidimensional Hall sensors for a determination at least of a physical dimension from the group: magnetic field strength, magnetic field direction, electromagnetic induction, electrical field strength, intensity of illumination, sound intensity. For example, it can be provided that the measuring element is designed as a permanent magnet and a magnetic field is provided, which can be detected by the respective sensors. The sensors can thereby exemplarily be designed as Hall sensors, in particular, as at least two-dimensional Hall sensors. Alternatively, the sensors can also be designed as coils, in which a voltage is induced by a relative motion of the measuring element designed as a permanent magnet, which voltage can also be evaluated as a sensor signal. In the case of an alternative embodiment of the sensors these are designed in the form of inductive proximity switches, in which an oscillation frequency of an oscillating circuit, which comprises an induction coil, is detuned by the presence, for example, of a ferritic measuring element and from which information about the relative position of the measuring element relative to the sensor can be obtained. Designs of the sensors as capacitive measuring sensors or optical measuring sensors can also additionally or alternatively be provided.

In the case of the use of Hall sensors three-dimensional Hall sensors in particular can be provided, which are designed for a determination of magnetic field strengths in three spatial directions perpendicular relative to each other. Preferably, for a purely position detection only one evaluation of two signals of the three-dimensional Hall sensor is provided, which are caused by two field strength components aligned perpendicularly relative to each other, while a third signal, which is determined by a third field strength component, remains unnoticed. Particularly preferably it is provided that the two magnetic field strength components used for the position detection are determined with the same Hall sensor measuring cell, which is read out alternatingly in directions perpendicular relative to each other.

In the case of an advantageous further development of the invention it can be provided that sensors arranged adjacently along the subsection of the motion path are arranged such that along the subsection of the motion path a detection of the measuring element is always ensured by at least two sensors, which in each case provide a presettable minimum level of the sensor signal. Thus, a comparison can always be made of sensor signals of adjacently arranged sensors, in order to obtain a particularly precise position signal. If the sensors are arranged relative to each other in different, at particularly irregular distances along the subsections of the motion path, it can be provided, to undertake an error compensation in the processing device for the sensor signals, in order to eliminate the different distances between the sensors and the deviations in the sensor signals resulting therefrom. Such a compensation can, for example, occur by a preceding calibration of the sensor system, in which one or several measuring elements are provided with a highly precise path measuring system and sensor signals of the path measuring system are compared with the sensor signals of the sensor system and, for example, are stored in the form of a calibration curve in the processing device.

In a further embodiment of the invention it is provided that at least a part of the sensors is arranged uniformly with a first division or equal spacing along the subsection of the motion path and/or that a part of the sensors, in particular, all sensors, are arranged on a mounting path, in particular, a mounting straight line, which runs parallel to the subsection of the motion path.

In this connection, the distance of the adjacent sensor cells is regarded as a division or equal spacing, which are accommodated in each case in discretely designed housings, while a distance of the adjacent housing is referred to as a housing distance. The sensor signals of those sensors, which are arranged uniformly with the first division along the motion path, can preferably be used without a preceding calibration of the sensor system, since position deviations of these sensors depend only on a mounting tolerance, which result during the mounting of the sensors, for example, on a printed circuit board. Since such position deviations are usually in the range of a few $\frac{1}{100}$ millimetres, it is possible to compare sensor signals provided by said sensors purely mathematically with each other. Preferably it is provided that the arrangement of the sensors with the first division leads to a housing distance between discretely designed, individually mounted sensors, which is measured by means of the detection ranges of the sensors and an influence area of the measuring elements and which, in practical terms, corresponds, for example, to at least 50 percent of an extent of the housing used for the sensors along the motion path. Thus, a cost-effective sensor system is made possible, in which an advantageous compromise between the required overlapping of detection areas of adjacent sensors and the number of sensors used can be made.

Preferably, it is provided that the measuring elements are applied to the movable components, such as, for example, rotors of the linear motor system such that adjacent measuring elements always have a distance relative to each other, which corresponds to at least nearly a 2-fold division of the sensors arranged in a regular first division. Thus, an undesired exertion of influence of a more remote measuring element on sensor signals of sensors can be suppressed, which are supposed to detect a measuring element which is arranged closer.

Since preferably it is provided that at least one part of the sensors, in particular, all sensors, are arranged on the mounting path, in particular, on a mounting straight line, which runs parallel to the subsection of the motion path, further tolerance influences on the sensor signals of the sensors can be minimised. In particular, a distance between the respective sensors and the measuring element transversely to the motion path is at least substantially constant and thus has only a slight, preferably an insignificant influence on the sensor signals of the sensors. This is the case in particular when two mutually perpendicular field components of a magnetic flux provided by the measuring element are determined by means of a multidimensional Hall sensor, wherein a first magnetic field component is extended along the motion path and wherein a second field component is aligned transversely to a magnetic polarity of the measuring element. In this case, courses for the respective field components are set on each of the sensors during a relative motion of the measuring element, which correspond to a sine function and a cosine function and which are converted in the sensor or in the processing device with the aid of an arctangent function into a linearised sensor signal, which independent of a distance between sensor and measuring element is in a direction transverse to the motion path.

It is advantageous, if two sensors adjacently arranged at at least one end area of the subsection of the motion path, in particular, a first and a second sensor arranged along the motion path and/or a penultimate and a last sensor arranged along the motion path, are arranged with a second division or equal spacing, which is selected to be smaller than the first division. Through these measures it can be achieved that a position of a measuring element can also be detected with sufficient accuracy even when this measuring element is located within a presettable measuring window away from the subsection of the motion path. In this connection, in the same way as in the case of an arrangement of the measuring element along the subsection of the motion path it is assumed that at least two sensors in each case provide a presettable minimum level of the sensor signal. If the measuring element is located within the presettable measuring window, for example, a first and a second sensor arranged along the motion path or a penultimate and a last sensor arranged along the motion path in each case provide sensor signals, which satisfy the requirements of the presettable minimum level for the sensor signal and thus also make possible a comparison of the two sensor signals, whereby precision in the position determination is made possible. Exemplarily it is provided, that the sensor device in each case has precisely two sensors arranged with respect to each other at end areas of the subsection of the motion path, while all other sensors are arranged with respect to each other according to the first division. From this it results that a first and a second sensor arranged along the motion path have a distance corresponding to the second division, while the distance of the second sensor to the third sensor corresponds to the first division. Furthermore, the third to last and the penultimate sensor are arranged at a distance according to the first division, while a distance between the penultimate sensor and the last sensor corresponds to the second division. Exemplarily, it can be provided that a housing distance for sensors, which are arranged according to the first division, corresponds at least approximately to an extent of the housing along the motion path, while a housing distance of sensors, which are arranged according to the second division, is designed, for example, as a production-related minimum distance between the adjacent housings of the sensors.

Preferably, it is provided that each of the sensors is accommodated in a separately designed housing and is arranged on a printed circuit board extended along the subsection of the motion path and/or that the processing device comprises a plurality of sensor interfaces, in particular, serial-peripheral interfaces for a parallel coupling with the sensors, wherein each of the sensor interfaces is connected with a clock generator, which is designed for a provision of a read-out signal to the interfaces.

It is advantageous if all of the sensors are accommodated in identically designed housings, which are designed in particular as SMD housings for a surface-solder mounting. For a stationary arrangement of the sensors along the motion path as well as for an electrical connection of the sensors to the processing device it is preferably provided to arrange the sensors on a printed circuit board, which can, for example, be a conductive plate or a flexible conductive film and which are fixed in a defined manner on a component, which determines the motion path, in particular, is designed as a stator of a linear motor arrangement. The processing device can, for example, be designed as a programmable gate array (FPGA—Field Programmable Gate Array) and comprises a plurality of sensor interfaces, so that each of the sensors, which are arranged along the subsection of the motion path, can communicate with the processing device by means of its own sensor interface. Furthermore, it is provided, that each of the sensor interfaces is connected with a clock generator, which is designed for a provision of a read-out signal to the interfaces. Preferably, the clock generator is designed as an oscillator with a presettable or non-adjustable clock frequency, such that a regular provision of trigger signals is made to the sensor interfaces, which accordingly read out their assigned sensors at regular time intervals and can feed the read-out sensor signals to the further processing. Alternatively, it can also be provided that the clock generator outputs trigger signals at irregular time intervals, for example, depending on presettable operating conditions of the sensor system and/or the condition of a downstream control device.

Exemplarily, it can be provided that the sensor interfaces are designed as serial peripheral interfaces (SPI—Serial-Peripheral Interface), in order to ensure a cost-effective and robust communication between the sensors and the processing device.

It is expedient if the processing device is connected electrically with an output interface designed in particular as a synchronous serial interface (SSI or as a Drive Cliq bus interface (Drive-Cliq is a registered trademark of Siemens AG), which is configured for a provision of the at least one position signal to a communication system designed preferably as a multiconductor arrangement or as a bus system. The output interface has the task of passing on position signals determined in the processing device to an, in particular, higher-order control device. This control device can, for example, be provided to exert an influence on the measuring elements or on the components assigned to the measuring elements and/or on the processing devices, which are provided for processing the measuring elements or the components.

In a further embodiment of the invention it is provided that the processing device is connected electrically with a display device, which comprises display elements arranged along a mounting path running parallel to the subsection of the motion path, which display elements are designed for an output of status signals depending on the determined position signals and/or that the subsection of the motion path is formed by a stator of a linear drive system, wherein the measuring element is assigned to a carrier movable along the stator. For example, the display device can be formed from light-emitting diodes arranged in a row, which are activated by the processing device in such a manner that in each case those light-emitting diodes light up with maximum intensity, which have a minimum distance to the respective measuring element. Thus, a particularly rapidly detectable visualisation is made possible for the position of the measuring element along the motion path. The sensor system can be used in an advantageous manner for detection of carriers of an in particular fluidically operable or electrically operable linear drive system and is preferably fixed on a stator of the linear drive system, which is, for example, a cylinder housing of a hydraulic cylinder or a pneumatic cylinder or a housing of a hydraulic or pneumatic pivot drive or a coil arrangement of an electrodynamic linear motor. The carrier can, for example, be a slidingly movable piston of a fluid cylinder accommodated in a cylinder housing or a rotor for an electrodynamic linear motor.

The problem addressed by the invention is solved by a method for determining a position of a measuring element along a motion path, which comprises the following steps: contactless detection at least of one physical dimension, which is dependent on the position of a measuring element along the motion path, with a plurality of sensors arranged along a subsection of the motion path, synchronous detection of sensor signals of the sensors by a processing device, which is connected electrically with the sensors, processing of the sensor signals to form at least one position signal, which represents the position at least of one measuring element along the motion path.

In the case of an advantageous further development of the method it is provided that the sensors are designed for detecting magnetic field components at least of one magnetic field at least of one measuring element and that at least two magnetic field components aligned perpendicular relative to each other are detected by the respective sensor and are processed to form a sensor signal, wherein the processing device compares the synchronously detected sensor signals of the sensors with a presettable minimum level for the sensor signal and processes those sensor signals of sensors arranged at least pairwise adjacent along the subsection of the motion path to form at least one position signal, which are above the presettable minimum level.

BRIEF DESCRIPTION OF THE DRAWINGS

An advantageous embodiment of the invention is shown in the drawing, in which:

FIG. 2 shows a highly schematised depiction of detection areas and signal levels of individual sensors of the sensor system depicted in FIG. 1, and FIG. 3 shows a section enlargement of an arrangement of a plurality of sensors with identical division or equal spacing, which is not part of the invention.

DETAILED DESCRIPTION

Figure 1:
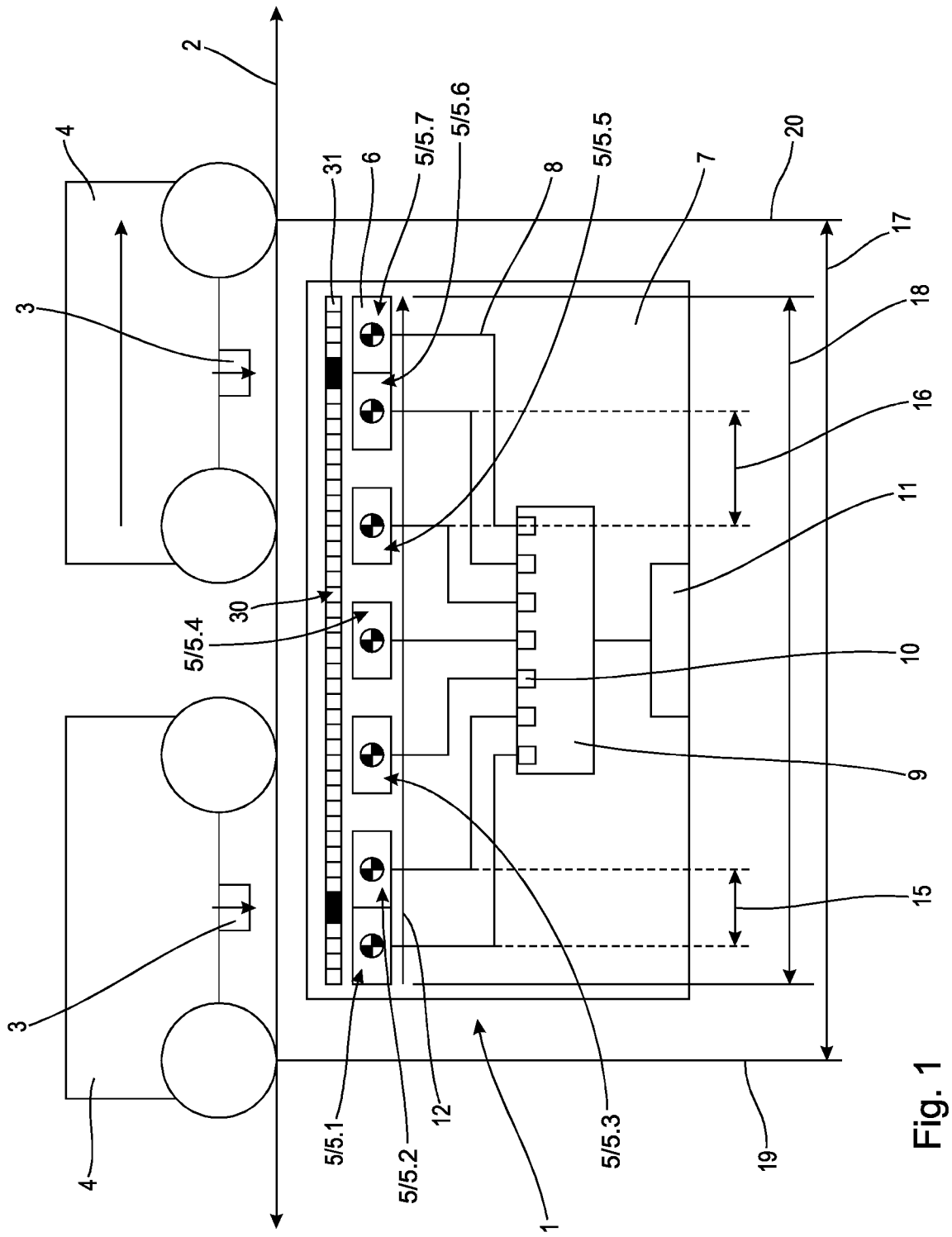
FIG. 1 shows a schematic representation of a sensor system, which is used for the detection of measuring elements, which are mounted on carriages for a linear drive system which is not shown in detail.

A sensor system 1 depicted in FIG. 1 is designed for the detection of positions of a plurality of measuring elements 3 movable along a motion path 2. Purely as an example, the measuring elements 3 are designed as cuboid permanent magnets with north-south magnetisation aligned transversely to the motion path and symbolised in each case by arrows and is attached to linearly movable carriage 4 of a linear motor arrangement not shown in detail, which carriage is movable along the motion path 2. For a position detection of said carriage 4 the sensor system 1 comprises a plurality of sensors 5, which exemplarily are accommodated in rectangular housings 6, wherein the housings 6, for example, are arranged on a rectangularly designed printed circuit board 7 electrically conductively and connected in a mechanically fixed manner with the latter. Each of the sensors 5 comprises a measuring cell not shown in detail, which is designed for the detection of a physical dimension. In the case of the depicted embodiment the measuring cells of the sensors 5 are designed, for example, in each case as multidimensional Hall sensors, which exemplarily can determine magnetic field components of the magnetic field provided by the measuring element 3 along the motion path 2 and aligned normal to the display level of FIG. 1. To identify the position of the respective measuring cell within the sensor 5 each of the sensors 5 is provided with a centre point.

The sensors 5 are in each case connected electrically via sensor lines 8 with a processing device 9, which is designed for a synchronous detection of signal levels of the respective sensors 5 and for a processing of the determined signal level to form at least one position signal. Purely as an example, the processing device 9 is designed as FPGA and for each sensor includes its own sensor interface 10. The processing device 9 also comprises an output interface 11, which can be designed for a communication with a higher-order control device which is not shown or with a further sensor system which is also not shown. Exemplarily the output interface is designed as a Drive-Cliq bus interface and thus makes possible a bus communication with a higher-order control of the control manufacturer Siemens, which is not shown, and which is designed for a coupling of sensors by means of the Drive-Cliq bus protocol.

The sensors 5 are, for example, applied on the printed circuit board 7 along a rectilinear mounting path 12 in the case of the embodiment shown, running parallel to the motion path. For example, it can be provided that the sensors 5 are designed for a surface solder mounting (SMD surface mount device) and in the case of the production of the sensor system 1 are mounted on the printed circuit board 7 by means of an automatic mounting system in the pick-and-place method which is not shown.

For example, it is provided that the sensors 5 are arranged along the motion path 2 in two different divisions or equal spacings. When the sensors 5 are viewed from left to right the first sensor 5.1 and the second sensor 5.2 are arranged relative to each other at a minimum distance 15, which results due to the size of the housings 6. The sensors 5.3, 5.4, 5.5 and 5.6 following the second sensor 5.2 are, however, arranged at an increased distance 16. The last two sensors 5.6 and 5.7 are, however, arranged again at the minimum distance 15 relative to each other. The larger distance 16 can thereby also be referred to as the first division, while the small distance 15 can also be referred to as the second division.

The processing device 9 is configured to process only sensor signals of those sensors 5, the signal level of which is above a presettable minimum level. Furthermore, the processing device 9 is configured to provide a position signal for a position of a measuring element to the output interface 11 only when at least two adjacently arranged sensors 5 in each case provide a sensor signal with a signal level above the presettable minimum level and when a comparison of the two sensor signals leads to a plausible position signal. Through these above cited conditions it results that the sensor system 1 is not designed for a detection of the entire motion path 2, but rather for a detection of a subsection 17 of the motion path 2 delineated symbolically in FIG. 1.

In addition, the processing device 9 can be configured due to its internal architecture, which can be designed in particular as FPGA, to detect the sensor signals of all of the sensors 5 synchronously. Thus, error influences are avoided, such as they could occur, for example, during the detection of moving measuring elements 3 and a sequential detection of sensor signals of sensors. Instead, through a synchronous activation of all of the sensor interfaces 10 with a clock generator, which is not shown, assigned to the processing device 9, an also synchronous query of all sensors 5 is undertaken by the processing device 9. The sensor signals arriving at the sensor interfaces 10 can subsequently be processed either in parallel or sequentially in the processing device 9 to form a position signal or, if applicable, to form several position signals, this depends on whether only one measuring element 3 or several measuring elements 3 are located within the subsection 17 of the motion path 2 detectable by the sensor system 1.

As can be learned from the depiction of FIGS. 1 and 2, the subsection 17 of the motion path 2 extends laterally beyond a longitudinal extension 18, which is determined by the housings 6 of the sensors 5. The limits 19, 20 of the subsection 17 result from an interaction of a magnetic minimum flux density 21 of the measuring element 3 designed as a permanent magnet, which, is depicted in a highly schematised manner with in each case purely exemplarily triangularly designed detection areas 22 of the sensors 5. It is thereby assumed, for example, that a sensor 5 can provide a sensor signal with a signal level above a presettable minimum level only when there is an overlapping of the exemplarily trapezoidally limited magnetic minimum flux density 21 with the respective detection area 22 of the sensor 5. For example, the measuring element 3 depicted on the left in FIG. 2 is arranged precisely so that the minimum flux density 21 overlaps both the detection area 22 of the sensor 5.1 as well as of the sensor 5.2. This results in signal levels depicted purely schematically under the respective sensors 5. In the same way, the right limit 20 for the subsection 17 results without a corresponding measuring element 3 being arranged here. Therefore, as soon as a measuring element 3 approaches the sensor system 1 coming from the left along the motion path 2, from that point in time the sensors 5.1 and 5.2 provide usable sensor signals to the processing device 9, from which the measuring element 3 has passed the left limit 19. From this point in time the sensor system 1 can always in each case process at least two usable sensor signals to form a position signal, until the measuring element 3 passes the right limit 20 and thus the condition is no longer met, that the detection areas 22 of at least two sensors 5 are overlapped by the minimum flux density 21.

Exemplarily the sensor system 1 comprises a display device 30, which is connected electrically with the processing device 9 in a manner not shown in detail. For example, the display device 30 is realised as display elements 31 arranged as an array in each case in the same division, designed in particular as light-emitting diodes. With the display device 30, for example, determined position values for measuring elements 3 can be visualised by lighting up and extinguishing display elements 31 assigned in each case, as this is depicted exemplarily in FIG. 1.

FIG. 3 serves to demonstrate the advantage of the arrangement of the sensors 5 with different divisions 15, 16 along the motion path 2, as this is realised in the sensor system according to FIGS. 1 and 2. For this purpose, FIG. 3 shows only the two left sensors 5.1 and 5.2, as they are known from FIGS. 1 and 2, wherein in the case of the sensor system according to FIG. 3 all sensors 5 are arranged in the same division, so that a distance 25 of the two sensors 5.1 and 5.2 is identical to the distance 23 for the sensors 5.3 to 5.5 known from FIGS. 1 and 2. In the comparison with FIG. 2 it can be seen that despite the increased distance 16 between the two sensors 5.1 and 5.2 in the case of the embodiment of FIG. 3 a distance 25 between the left limit 19 and the second sensor 5.2 is identical to the distance 23 between the left limit 19 and the second sensor 5.2 according to FIG. 2. From this it results that despite an increase in the longitudinal extension for the sensor system according to FIG. 3 no increase of the motion path 2 detectable by the sensors 5 occurs compared to the embodiment according to FIGS. 1 and 2. Accordingly, with the sensor system according to the embodiment of FIGS. 1 and 2 a measuring element 3 can be detected within a subsection 17 of the motion path 2, which is identical to a subsection not shown in detail for the embodiment of a sensor system according to FIG. 3.

What is claimed is:

1. A linear transport system comprising:
    a linear motor arrangement;
    a plurality of movable carriages, said plurality of movable carriages including a first movable carriage and a second movable carriage, the first and second movable carriages being movable along a motion path of the linear motor arrangement;
    a first measuring element attached to the first movable carriage;
    a second measuring element attached to the second movable carriage; and
    a sensor system for the detection of a position of the first and second measuring elements along of the motion path, the sensor system comprising:
        a plurality of sensors arranged along the motion path, each of the plurality of sensors being adapted for the contactless detection of at least of one physical dimension dependent on a position of a respective measuring element along the motion path; and
        a processing device, connected electrically with the plurality of sensors, said processing device being adapted for a processing of the sensor signals to form a first position signal and a second position signal, the first position signal representing the position of the first measuring element along the the motion path, and the second position signal representing the position of the second measuring element along the motion path, wherein the processing device is designed for a synchronous detection of sensor signals of the sensors, and wherein the processing device comprises:
            a plurality of sensor interfaces for a parallel coupling with the sensors and
            a clock generator, wherein each of the sensor interfaces is connected with the clock generator, and wherein the clock generator is designed for a provision of a read-out signal to the sensor interfaces.

2. The linear transport system according to claim 1, wherein the sensors are designed for a determination at least of one physical dimension from the group: magnetic field strength, magnetic field direction, electromagnetic induction, electrical field strength, intensity of illumination, sound intensity.

3. The linear transport system according to claim 2, wherein the sensors are designed as multidimensional Hall sensors.

4. The linear transport system according to claim 1, wherein at least a set of the plurality of sensors is arranged along the motion path uniformly with a first division, said first division ensuring a detection of the measuring element by at least two sensors, wherein each of the two sensors provides a sensor signal level, which is above a pre-set minimum sensor signal level, and wherein the processing device processes the sensor signals of the two sensors to form the first position signal or the second position signal.

5. The linear transport system according to claim 4, wherein at least one part of the sensors are arranged on a mounting path, which runs parallel to the motion path.

6. The linear transport system according to claim 5, wherein all sensors are arranged on the mounting path which runs parallel to the motion path.

7. The linear transport system according to claim 5, wherein all sensors are arranged on a mounting straight line which runs parallel to the motion path.

8. The linear transport system according to claim 5, wherein, on at least one end area of the motion path, two adjacently arranged sensors are arranged with a second division, which is selected to be smaller than the first division.

9. The linear transport system according to claim 8, wherein a first and a second sensor arranged along the motion path and/or a penultimate and a last sensor arranged along the motion path are arranged with a second division, which is selected to be smaller than the first division.

10. The linear transport system according to claim 1, wherein each of the sensors is accommodated in a separately designed housing and is arranged on a printed circuit board extending along the motion path.

11. The linear transport system according to claim 10, wherein the processing device comprises a plurality of serial-peripheral interfaces for a parallel coupling with the sensors.

12. The linear transport system according to claim 1, wherein the processing device is connected electrically with an output interface which is configured for a provision of the at least one position signal to a communication system.

13. The linear transport system according to claim 12, wherein the output interface is designed as a synchronous serial interface or as a Drive Cliq bus interface, which is configured for a provision of the at least one position signal to a multiconductor arrangement or a bus system.

14. The linear transport system according to claim 1, wherein the processing device is connected electrically with a display device, the display device comprising display elements arranged along a mounting path running parallel to the motion path, the display device being designed for an output of status signals depending on the determined position signals and/or wherein the motion path is formed by a stator of a linear drive system, wherein the measuring element is assigned to a carrier movable along the stator.

15. A method for determining a position of two measuring elements along a motion path of a linear transport system, the method comprising:

contactless detection of at least one physical dimension, dependent on the position of a measuring element along the motion path, with a plurality of sensors arranged along the motion path;

synchronous detection of sensor signals of the sensors by a processing device, the processing device being connected electrically with the sensors and the processing device comprising a plurality of sensor interfaces for a parallel coupling with the sensors, wherein each of the sensor interfaces is connected to a clock generator, the clock generator being designed for a provision of a read-out signal to the sensor interfaces;

processing of the sensor signals to form a first position signal representing the position of a first measuring element along the motion path;

and, processing of the sensor signals to form a second position signal representing the position of a second measuring element along the motion path, wherein the sensors are designed for the detection of first magnetic field components of a first magnetic field provided by the first measuring element and second magnetic field components of a second magnetic field provided by the second measuring element, and wherein at least two magnetic field components of the first magnetic field or the second magnetic field which are aligned perpendicular to each other are detected by the respective sensor and are processed to form a respective sensor signal, and wherein the processing device compares the synchronously detected sensor signals of the sensors with a pre-set minimum sensor signal level, and wherein the processing device forms the first position signal from sensor signals of two or more adjacent sensors that provide sensor signals which are above the pre-set minimum sensor signal level, and wherein the processing device forms the second position signal from sensor signals of two or more adjacent sensors that provide sensor signals which are above the pre-set minimum sensor signal level.

* * * * *